Dec. 7, 1965  D. D. NASGOWITZ  3,221,930
BATTERY STORAGE AND DISPENSING UNIT
Filed June 11, 1964
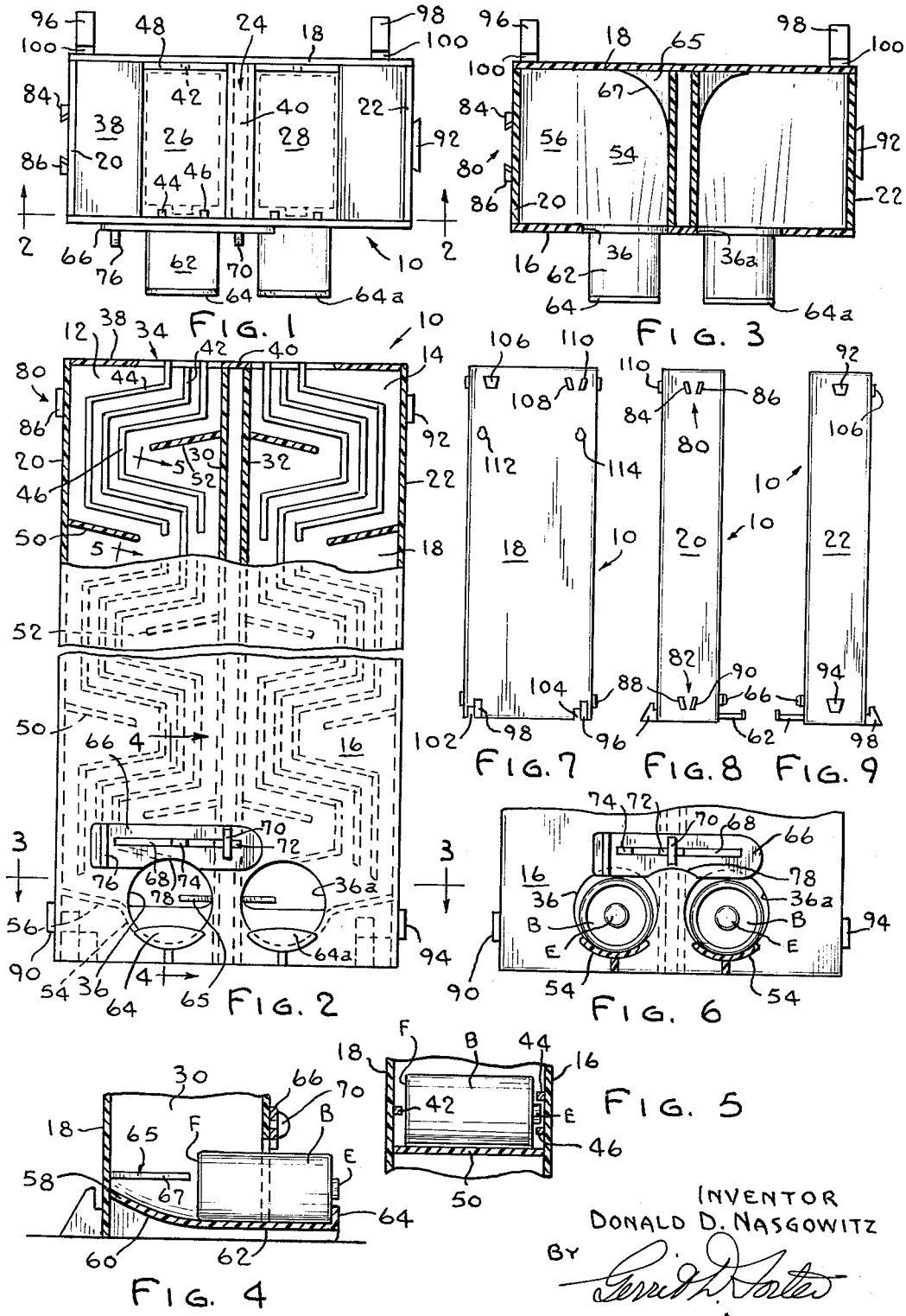
INVENTOR
DONALD D. NASGOWITZ
BY
ATTORNEY 3,221,930
BATTERY STORAGE AND DISPENSING UNIT
Donald Dean Nasgowitz, Milwaukee, Wis., assignor to Display Corporation, Milwaukee, Wis., a corporation of Wisconsin
Filed June 11, 1964, Ser. No. 374,410
17 Claims. (Cl. 221—92)

This invention relates to storage and dispensing units adapted for use with dry cell batteries of the type having a generally cylindrical shape with an electrode extending axially from one end thereof.

A general object of this invention is to insure uniform orientation of batteries in a unit of this type.

Other, more specific, objects of this invention are to provide such a unit with a discharge arrangement which permits batteries to be stored with their axes disposed generally normal to the front wall of the unit while delivering batteries through the front wall of the unit for removal; and, furthermore, to render a unit of this type relatively tamperproof.

For the achievement of these and other objects, this invention proposes to provide means at the point of insertion of batteries into the storage and dispensing unit which blocks insertion of the batteries unless they are facing in a particular, desired direction. Preferably, the batteries are stacked vertically and discharged through the front wall of the unit by an arrangement which receives the batteries at the end of their vertical movement and moves the batteries horizontally through the front wall of the unit. Where desired, a latch arrangement is used at the point of discharged of batteries through the front wall and is adapted to prevent removal of batteries without release of the latch, thereby rendering the unit somewhat tamperproof in the sense that batteries cannot be released for removal without an obvious, physical movement of the latch.

Other objects and advantages will be pointed out in, or be apparent from, the specification and claims, as well obvious modifications of the embodiment shown in the drawings, in which:

FIG. 1 is a top plan view of a storage and dispensing unit embodying this invention;

FIG. 2 is a front elevation of the unit with portions broken away to expose the interior thereof;

FIG. 3 is a section view taken generally along line 3—3 of FIG. 2;

FIG. 4 is a section view taken generally along line 4—4 of FIG. 2 and illustrating a battery in the discharge opening;

FIG. 5 is a section view taken generally along line 5—5 of FIG. 1 and illustrating a battery as it passes through one of the storage areas;

FIG. 6 is a partial front elevation of the discharge end of the unit illustrating the batteries and their association with the tamper-proof latch;

FIG. 7 is a rear elevation of the unit;

FIG. 8 is an elevation of one end of the unit; and

FIG. 9 is an elevation of the opposite end of the device.

In the drawings, the invention is illustrated as embodied in a storage and dispensing unit 10 comprising dual storage and dispensing compartments 12 and 14. The unit is built up by vertical front and rear walls 16 and 18, vertical end walls 20 and 22 and a vertical partition 24 intermediate the end walls and extending between the front and rear walls to divide the interior of unit 10 into the storage areas 26 and 28 of compartments 12 and 14. Preferably, the front, rear and end walls are made of a suitable transparent plastic material to expose the batteries when they are arranged in storage areas. With this construction the storage and dispensing unit also functions in the nature of a point of purchase display.

In the illustrated embodiment, partition 24 comprises a pair of walls 30 and 32, one for each of the compartments 12 and 14; however, one common partition wall could be provided between storage units 12 and 14. It will also be appreciated that although the invention is illustrated as embodied in a unit incorporating dual storage compartments, one or more compartments can be incorporated in a single unit as desired.

Since storage compartments 12 and 14 are identical in construction, only one will be described in detail and it will be understood that the description is equally applicable to either compartment. Compartment 12 provides a vertically extending battery storage area which receives batteries through entrance opening 34 at its upper end and discharges batteries through discharge opening 36 at its lower end. Entrance opening 34 is formed by front and rear walls 16 and 18 and by cover strip 38 which extends from end wall 20 toward and terminates in spaced relationship from a second cover strip 40 suitably attached to partition 24. The storage and dispensing unit of this invention is preferably intended for use with electrical batteries B (illustrated in FIGS. 4, 5 and 6) of conventional construction, namely being generally cylindrical and having an electrode E extending axially from one end thereof, in other words a common flashlight-type battery. To accommodate this type of battery, front and rear walls 16 and 18 are spaced apart a distance greater than the axial length of battery B (i.e. from the end of electrode E to the opposite or rear face F). However, the spacing between cover strips 38 and 40 is less than the axial length of the battery but greater than the diameter of the battery so that batteries can only be inserted in the storage area if they are aligned with end walls 20 and 22.

An aspect of this invention is to provide a storage and dispensing unit of this type which insures uniform orientation of the batteries in the unit. In the illustrated preferred embodiment, it is contemplated that the batteries be aligned with their electrodes E facing toward front wall 16. To achieve this uniform orientation, means is provided at entrance opening 34 to prevent insertion of batteries unless they are so oriented. Preferably, projection 42 is provided on rear wall 18 and is located centrally of opening 34 and projections 44 and 46 are provided on front wall 16 and are offset in opening 34 to either side of center, and correspondingly projection 42. Projections 42, 44 and 46 extend into storage area 26 and terminate in spaced relationship with the distance between projection 42 and projections 44 and 46 and their respective oppositely facing walls 16 or 18 being greater than the axial length of the batteries whereas the distance between the projections themselves is less than the axial length of the batteries. With this arrangement, batteries can only be inserted with their electrodes E facing front wall 16 and positioned between projections 44 and 46. If an attempt is made to insert the batteries in a reverse direction, electrode E strikes projection 42 and battery end F strikes projections 44 and 46 thereby blocking insertion of the batteries. Although the provision of a single projection 42 on wall 18 provides satisfactory results, it is preferable that projection 42 terminates in strip 48 which extends between cover strips 38 and 40 and into area 26 a distance equal to the extension of projection 42. The use of strip 48 is preferred as it positively prevents improper insertion of batteries and possible jamming of the entrance opening 34. Here again it will be appreciated that strip 48 need not necessarily extend completely between strips 38 and 40 but may only be provided in the central portion of the opening for effective operation.

Storage area 26 is also provided with means defining a tortuous path for the batteries to follow between the entrance and discharge openings. Preferably, baffles 50 and 52 are positioned in the storage area and extend from walls 20 and 30 in vertically staggered relationship to define the tortuous path for the batteries. Baffles 50 and 50 provide a dual advantage in the unit by both breaking the vertical fall of the batteries and also providing eye-catching motion of the batteries in the unit both during loading and whenever a battery is withdrawn through discharge opening 36.

Turning now to the battery discahrge portion of the unit, the lower end of compartment 12 is closed by bottom wall 54. Wall 54 is formed to include shelf 56 sloping downwardly from end wall 20 toward wall 30, angular shelf 56 in effect providing the lowermost baffle in the tortuous path. Wall 54 further includes chute portion 58 located at the end of shelf 56 and having an arcuate portion 60 sloping downwardly from wall 18 toward discharge opening 36 to a horizontal portion 62 extending externally of wall 16 and terminating in a vertically disposed stop 64. With this arrangement, batteries are inserted through opening 34, follow the tortuous path defined by baffles 50 and 52 and are delivered from shelf 56 into chute 58 which discharges the batteries through opening 36. To assist in moving the batteries laterally of storage area 26 and onto horizontal portion 62, shelf 65 is located in the corner defined by walls 18 and 30 and includes arcuate face 67 which faces toward shelf 56 and opening 36 in a manner to guide batteries through opening 36.

Although projections 42, 44 and 46 can be provided only at entrance opening 34 and provide satisfactory results by preventing insertion of batteries unless they are oriented in a desired direction, it is desirable to extend the projections in the form of ribs substantially throughout the tortuous path defined in storage area 26. As can be seen in FIG. 1, the ribs follow the path defined by the baffles and in this manner rib projections 44 and 46 provide the additional function of defining a track for confining battery movement. It will also be noted that rib projections 42 and 44 terminate along an angular line extending from the point of connection of shelf 56 with wall 20 to the end of lowermost baffle 52, whereas, rib projection 46 extends beyond that point and parallel to shelf 56, this construction is preferred as the extension of rib 46 prevents battery bounce and insures proper guidance of the batteries into shelf 56 and chute 58 for delivery through discharge opening 36.

In point of purchase storage and dispensing units of this type it is common practice to construct the device so as to be at least somewhat, if not completely, tamper-proof. In this unit latch 66 can be used if tamper-proofing is desired. Structurally, latch 66 includes elongated slot 68 and is supported on the unit by a generally T-shaped retainer 70 which is engaged in the slot. Latch 66 is movable on the retainer transversely of discharge openings 36 and 36a with the retainer 70 including base 72 engaged in slot 68 to limit movement of the latch in one direction and projection 74 on wall 16 also being engaged in slot 68 to limit latch movement in an opposite direction. Tab 76 is provided on the latch to facilitate movement of the latch and the latch is provided with an arcuate notch 78 which can be moved into registry with discharge opening 36 as illustrated in FIG. 2 (this position being determined by base 72) or to a point intermediate the discharge openings as illustrated in FIG. 6 (this position being determined by projection 74). In operation and with batteries disposed in the discharge opening and latch 66 positioned as illustrated in FIG. 6, the latch interferes with battery movement to the extent that available battery movement is insufficient to clear steps 64 and 64a. The batteries cannot be removed unless latch 66 is moved to the left to clear the latch from discharge opening 36a and move notch 78 into registry with discharge opening 36 (FIG. 2) in which position batteries may be removed freely. With this arrangement the device is tamper-proof to the extent that batteries cannot be removed from the device without moving latch 66 thereby requiring an obvious additional movement to thereby at least expose persons attempting unauthorized removal to detection.

Units of the type to which this invention relates are generally intended to be displayed on a counter top and more than one unit may be used in which case it becomes desirable that the units be interlocked in some manner to maintain an orderly arrangement. In the illustrated embodiment, connections are provided on end walls 20 and 22 with wall 20 including vertically spaced pairs 80 and 82 of strips, strips 84, 86, 88 and 90 of each pair are relatively spaced and angularly disposed to define a wedge-shaped opening therebetween. Wall 22 is provided with vertically spaced wedge blocks 92 and 94 which are aligned with the strip pairs 80 and 82 and it will be obvious that if a unit constructed identically to unit 10 is placed end-to-end with unit 10 its wedges or strips will align with the wedges or strips of unit 10 so that a locking connection can be made therebetween. It will also be noted that the inner vertical edges of the strips diverge outwardly toward wall 20 whereas the vertical edges of wedges 92 and 94 diverge inwardly toward wall 22 so that a locking dovetail-type connection can be provided therebetween.

Furthermore, the units are constructed to permit connection in back-to-back relationship. More particularly, unit 10 includes support feet 96 and 98 which extend laterally of wall 18 and are each provided with a vertically opening notch 100. Rear wall 18 also includes notches 102 and 104 positioned adjacent feet 96 and 98 and extending upwardly to a point at the lower end of notch 100. It will be obvious that feet of a similar unit will fit into notches 102 and 104 whereas feet 96 and 98 of unit 10 will fit into notches in the similar unit and with portions of rear wall 18 engaged in notch 100 to lock the units together. To further insure a proper interlock between the units, rear wall 18 is also provided with a wedge 106 identical to wedges 92 and 94 and strips 108 and 110 identical to those of strip paris 80 and 82. With this arrangement, wedge 106 will connect with the strips of a similar unit and the wedge of the similar unit will connect with strips 108 and 110 to positively lock the units together top and bottom. Lastly, key hole openings 112 and 114 are provided in rear wall 18 in the event that it is desired to mount the display device on a wall.

The provision of this type of connection between adjacent units is also contained in the prior filed copending application of Lloyd A. Sauer for a "Storage and Dispensing Unit," Serial No. 288,167, filed June 17, 1963, and assigned to the assignee of this application.

Although but one embodiment of the present invention has been illustrated and described, it will be apparent to those skilled in the art that various changes and modifications may be made therein without departing from the spirit of the invention or from the scope of the appended claims.

What I claim is:
1. A storage and dispensing unit for batteries of the type having an electrode portion extending axially from one end thereof and comprising, in combination,
    first and second pairs of opposed walls connected to define a battery storage area having an entrance end and a discharge end, the walls of said first pair of walls being spaced apart a distance greater than the axial length of said batteries,
    and means at the entrance end of said storage area for blocking insertion of batteries into said storage area unless the electrode portion of the battery is extending toward a first wall of said first pair of walls, said means including a first projection on a second wall of said first pair of walls and extending into said storage area and substantially across said second wall at said entrance and also including second and third projections on said first wall projecting from said first wall into said storage area toward said second wall and terminating in spaced relation from said first projection a distance less than the axial length of said batteries, said second and third projections being relatively spaced to accommodate the battery electrode therebetween so that batteries can be inserted in said storage area only with the electrodes thereof facing said first wall and disposed between said second and third projections.

2. A storage and dispensing unit for batteries of the type having an electrode portion extending axially from one end thereof and comprising, in combination,
first and second pairs of opposed walls connected to define a battery storage area having an entrance end and a discharge end, the walls of said first pair of walls being spaced apart a distance greater than the axial length of said batteries to define an entrance opening at said entrance end,
first means at said entrance end extending normal to said first pair of walls and restricting the dimension of said entrance opening parallel to said first pair of walls to less than the axial length of said batteries and greater than the battery diameter,
and orienting means at said entrance end and in said entrance opening for blocking insertion of batteries into said storage area unless the electrode portion of the battery is extending toward a first wall of said first pair of walls, said orienting means including a first projection on a second wall of said first pair of walls and arranged generally centrally of said entrance opening and also including at least a second projection on said first wall offset from said first projection, said first and second projections extending toward each other into said storage area and terminating in spaced relation a distance less than the axial length of said batteries so that batteries can be inserted in said storage area only with the electrodes thereof facing said first wall.

3. The storage and dispensing unit of claim 2 including means defining a discharge opening at the discharge end of said unit,
means defining a tortuous path in said battery storage area extending between said entrance and discharge openings,
and means within said area at said discharge opening defining an angular surface sloping toward said discharge opening and operative to receive and project batteries through said discharge openings.

4. A storage and dispensing unit for batteries of the type having an electrode portion extending axially from one end thereof and comprising, in combination,
vertically extending wall portions defining a vertical, generally hollow battery storage area,
means defining a battery entrance opening at the upper end of said battery storage area and including oppositely disposed portions of said vertical wall portions which are spaced apart a distance greater than the axial length of said batteries and also including means restricting the dimension of said entrance opening parallel to said wall portions to less than said axial length and greater than the diameter of said batteries,
means at the lower end of said battery storage area defining a battery discharge opening,
and orienting means at said entrance opening for blocking insertion of batteries into said storage area unless the electrode portion of the battery is extending toward a first one of said oppositely disposed wall portions, said orienting means composed a first projection on a second one of said oppositely disposed wall portions arranged generally centrally of said entrance opening and at least one projection on said first wall portion offset from said first projection, said first and second projections extending toward each other into said storage area and terminating in spaced relation a distance less than the axial length of said batteries so that batteries can be inserted in said storage area only with the electrodes thereof facing said first wall portion.

5. The storage and dispensing unit of claim 4 including means disposed in said storage area and defining a tortuous path between said entrance and discharge openings.

6. The storage and dispensing unit of claim 5 wherein said discharge opening opens through one of the vertical walls of said unit, and including means defining an angular surface within said storage area at the termination of said tortuous path and sloping toward said discharge opening to receive and project batteries through said discharge opening.

7. The storage and dispensing unit of claim 6 wherein said first and second projections extend from said entrance opening into said storage area and along said tortuous path.

8. The storage and dispensing unit of claim 6 wherein said angular surface extends exteriorly of said wall and terminates in a vertically disposed stop member having a predetermined vertical projection, and including,
latch means,
and means mounting said latch means adjacent said discharge opening and for movement relative thereto between a first position overlapping a portion of said discharge opening to limit upward movement of a battery in said discharge opening to an amount insufficient to clear said stop member and a second position out of overlapping relation with said discharge opening to expose said discharge opening to permit sufficient movement of said battery to clear said stop member.

9. A storage and dispensing unit for batteries of the type having an electrode portion extending axially from one end thereof and comprising, in combination,
first and second pairs of opposed walls connected to define a battery storage area having an entrance end and a discharge end, the walls of said first pair of walls spaced apart a distance greater than the axial length of said batteries to define an entrance opening at said entrance end,
first means at said entrance end extending into said entrance opening and disposed generally normal to said first pair of walls ad restricting the dimension of said entrance opening parallel to said first pair of walls to less than the axial length of said batteries and greater than the battery diameter,
means including opposed baffle means extending into said storage area and positioned in relative vertical staggered relationship on the walls of said second pair of walls to define a tortuous path through said storage area,
a first projection on a first wall of said first pair of walls arranged generally centrally of said entrance opening and second and third relatively spaced projections on a second wall of said first pair of walls arranged on opposite sides of said first projection, said projections on said first and second walls extending toward each other into said storage area and terminating in spaced relation a distance less than the axial length of said batteries so that batteries can be inserted in said storage area only with the electrodes thereof facing said first wall and arranged between said second and third projections.

10. The storage and dispensing unit of claim 9 wherein said discharge opening opens through a vertical wall of said unit and including
means defining an angular surface extending in a direction generally parallel to said baffle means and sloping toward said discharge opening, said angular surface arranged adjacent the lowermost baffle means for receiving and projecting batteries through said discharge opening.

11. The storage and dispensing unit of claim 10 including a shelf member disposed above said angular surface and including a generally arcuate surface facing toward said discharge opening and said lowermost baffle means to assist in projecting batteries through said discharge opening.

12. The storage and dispensing unit of claim 10 wherein said angular surface extends exteriorly of said wall and terminates in a vertically disposed stop member having a predetermined vertical projection, and including latch means, and means mounting said latch means adjacent said discharge opening and for movement relative thereto between a first position overlapping a portion of said discharge opening to limit upward movement of a battery in said discharge opening to an amount insufficient to clear said stop member and a second position out of overlapping relation with said discharge opening to expose said discharge opening to permit sufficient movement of said battery to clear said stop member.

13. The storage and dispensing unit of claim 10 wherein said first projection terminates in a strip extending across at least the central portion of one end of said entrance opening and having a projection into said entrance opening equal to that of said first projection.

14. The storage and dispensing unit of claim 10 wherein said first, second and third projections extend in the form of ribs through said storage area along said tortuous path and wherein at least the uppermost of said second and third ribs at said lowermost baffle means extends over and generally parallel to said lowermost baffle means.

15. A storage and dispensing unit for batteries of the type having an electrode portion extending axially from one end thereof and comprising first and second storage compartments, each of said compartments comprising, in combination, first and second pairs of opposed walls connected to define a battery storage area having an entrance end and a discharge end, the walls of said first pair of walls spaced apart a distance greater than the axial length of said batteries to define an entrance opening at said entrance end, first means at said entrance end extending generally normal to said first pair of walls into said entrance opening restricting the dimension of said entrance opening parallel to said first pair of walls to less than the axial length of said batteries and greater than the diameter of said batteries, means including opposed projections extending into said area and positioned in relative vertical staggered relationship on the walls of said second pair of walls to define a tortuous path through said storage area, and a first projection on a first wall of said first pair of walls arranged generally centrally of said entrance opening and second and third relatively spaced projections on a second wall of said first pair of walls arranged on opposite sides of said first projection, said projections on said first and second walls extending toward each other into said storage area and terminating in spaced relation a distance less than the axial length of said batteries so that batteries can be inserted in said storage area only with the electrodes thereof facing said first wall and arranged between said second and third projections.

16. A storage and dispensing unit for batteries of the type having an electrode portion extending from one end thereof and comprising, in combination, means defining a vertical battery storage compartment including means defining an entrance opening at its upper end and means defining a discharge opening at its lower end, and means at said entrance opening restricting said entrance opening in a first direction to a dimension less than the axial length of said batteries and greater than the battery diameter and also including orienting means spaced apart in a second direction normal to said first direction a distance less than the axial distance of said batteries, said orienting means also defining an opening forming an extension of said dimension and increasing said dimension to an amount greater than the axial length of said batteries, said extension opening having a limited extension in said first direction so that batteries can be inserted in said storage area only with the electrodes thereof disposed in said extension.

17. The storage and dispensing unit of claim 16 including means defining a path for movement of batteries from said entrance opening to said discharge opening, and means disposed at the lower end of said path and extending in a direction parallel to said second direction toward said discharge opening for receiving and projecting batteries through said discharge opening.

References Cited by the Examiner

UNITED STATES PATENTS 1,753,957  4/1930  Washburn _____ 221—311

FOREIGN PATENTS 520,192  1/1956  Canada.

RAPHAEL M. LUPO, *Primary Examiner.*

UNITED STATES PATENT OFFICE
CERTIFICATE OF CORRECTION

Patent No. 3,221,930            December 7, 1965

Donald Dean Nasgowitz

It is hereby certified that error appears in the above numbered patent requiring correction and that the said Letters Patent should read as corrected below.

Column 5, line 73, for "composed" read -- comprising --; column 6, line 49, for "ad" read -- and --.

Signed and sealed this 18th day of October 1966.

(SEAL)
Attest:

ERNEST W. SWIDER            EDWARD J. BRENNER
Attesting Officer            Commissioner of Patents